(12) United States Patent
McQuarrie et al.

(10) Patent No.: US 8,086,946 B2
(45) Date of Patent: Dec. 27, 2011

(54) METHODS AND APPARATUS FOR OPTIMIZING RESPONSIVENESS OF PORTABLE DOCUMENTS

(75) Inventors: Mary Elizabeth McQuarrie, Arroyo Grande, CA (US); David Rudi Sherry, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1384 days.

(21) Appl. No.: 11/515,627

(22) Filed: Sep. 5, 2006

(65) Prior Publication Data

US 2011/0173314 A1    Jul. 14, 2011

(51) Int. Cl.
    *G06F 17/00* (2006.01)
(52) U.S. Cl. .................................. 715/200; 715/255
(58) Field of Classification Search .............. 715/255, 715/200, 234
    See application file for complete search history.

(56) References Cited

U.S. PATENT DOCUMENTS

| | | | | |
|---|---|---|---|---|
| 5,737,599 A | * | 4/1998 | Rowe et al. | 707/10 |
| 5,781,785 A | * | 7/1998 | Rowe et al. | 715/234 |
| 5,819,301 A | * | 10/1998 | Rowe et al. | 715/235 |
| 5,913,033 A | * | 6/1999 | Grout | 709/219 |
| 5,918,013 A | * | 6/1999 | Mighdoll et al. | 709/217 |
| 6,745,224 B1 | | 6/2004 | DSouza et al. | |
| 2001/0044797 A1 | | 11/2001 | Anwar | |
| 2002/0111973 A1 | * | 8/2002 | Maddalozzo et al. | 707/526 |
| 2004/0236752 A1 | | 11/2004 | Han et al. | |

OTHER PUBLICATIONS

Patent Cooperation Treaty, Notification of Transmittal of International Search Report and Written Opinion, Application No. PCT/US07/77377, dated Apr. 15, 2008.

* cited by examiner

*Primary Examiner* — Stephen Hong
*Assistant Examiner* — Manglesh Patel
(74) *Attorney, Agent, or Firm* — Kilpatrick Townsend & Stockton LLP

(57) ABSTRACT

A system detects a requirement to obtain a first document by the computer system, the first document having a predefined format. The system identifies a sequence of portions of the first document to obtain based on analysis of the predefined format of the first document, and analysis of current operational parameters of the computer system. The system obtains a first portion of the document from the identified sequence, and then obtains successive portions of the first document in accordance with the identified sequence.

21 Claims, 9 Drawing Sheets

204 IDENTIFY A SEQUENCE OF PORTIONS OF THE FIRST DOCUMENT TO OBTAIN BASED ON:
I) ANALYSIS OF THE PREDEFINED FORMAT OF THE FIRST DOCUMENT,
II) ANALYSIS OF CURRENT OPERATIONAL PARAMETERS OF THE COMPUTER SYSTEM

> 205 ASSESS A SIZE ASSOCIATED WITH THE FIRST DOCUMENT
>
> ↓
>
> 206 IDENTIFY AT LEAST ONE FIRST DOCUMENT STRUCTURE ASSOCIATED WITH THE FIRST DOCUMENT
>
> ↓
>
> 207 COLLECT FIRST DOCUMENT STRUCTURE INFORMATION ASSOCIATED WITH THE AT LEAST ONE FIRST DOCUMENT STRUCTURE, THE FIRST DOCUMENT STRUCTURE INFORMATION INCLUDING AT LEAST ONE OF:
> i) A LOCATION ASSOCIATED WITH THE AT LEAST ONE FIRST DOCUMENT STRUCTURE
> ii) A SIZE ASSOCIATED WITH THE AT LEAST ONE FIRST DOCUMENT STRUCTURE

OR

208 IDENTIFY A CONNECTION BETWEEN THE COMPUTER SYSTEM AND AT LEAST ONE OTHER COMPUTER SYSTEM

*FIG. 3*

209 IDENTIFY A SEQUENCE OF PORTIONS OF THE FIRST DOCUMENT TO OBTAIN BASED ON:
I) ANALYSIS OF THE PREDEFINED FORMAT OF THE FIRST DOCUMENT,
II) ANALYSIS OF CURRENT OPERATIONAL PARAMETERS OF THE COMPUTER SYSTEM

210 IDENTIFY AT LEAST ONE SECOND DOCUMENT INCLUDING AT LEAST ONE SECOND DOCUMENT STRUCTURE

↓

211 IDENTIFY A REQUEST TO OBTAIN THE AT LEAST ONE SECOND DOCUMENT STRUCTURE IN CONJUNCTION WITH OBTAINING THE AT LEAST A PORTION OF THE FIRST DOCUMENT

OR

212 IDENTIFY A CAPACITY ASSOCIATED WITH THE COMPUTER SYSTEM, THE CAPACITY INCLUDING AT LEAST ONE OF:
i) A NETWORK AVAILABILITY ASSOCIATED WITH THE COMPUTER SYSTEM
ii) A TRANSFER SPEED ASSOCIATED WITH THE COMPUTER SYSTEM, THE TRANSFER SPEED ASSOCIATED WITH OBTAINING AT LEAST ONE DOCUMENT

*FIG. 4*

219 IDENTIFY AT LEAST ONE FIRST DOCUMENT STRUCTURE ASSOCIATED WITH THE FIRST DOCUMENT

220 RECEIVE A REQUEST FROM A USER TO RETRIEVE THE AT LEAST ONE FIRST DOCUMENT STRUCTURE

OR

221 MAINTAIN A STATUS ASSOCIATED WITH THE AT LEAST ONE FIRST DOCUMENT STRUCTURE, THE STATUS IDENTIFYING WHETHER THE AT LEAST ONE FIRST DOCUMENT STRUCTURE HAS BEGUN A DOWNLOAD

*FIG. 6*

```
┌─────────────────────────────────────────────────────────────────────────┐
│ 223 IDENTIFY AT LEAST ONE FIRST DOCUMENT STRUCTURE ASSOCIATED WITH      │
│ THE FIRST DOCUMENT                                                      │
│  ┌───────────────────────────────────────────────────────────────────┐  │
│  │ 224 ANTICIPATE RECEIPT OF A REQUEST FOR THE AT LEAST ONE FIRST    │  │
│  │ DOCUMENT STRUCTURE                                                │  │
│  │   ┌─────────────────────────────────────────────────────────────┐ │  │
│  │   │ 225 ANTICIPATE RECEIPT OF A REQUEST FROM A USER BASED       │ │  │
│  │   │ ON A REQUEST HISTORY ASSOCIATED WITH THE USER               │ │  │
│  │   └─────────────────────────────────────────────────────────────┘ │  │
│  │                                                                   │  │
│  │                                 OR                                │  │
│  │                                                                   │  │
│  │   ┌─────────────────────────────────────────────────────────────┐ │  │
│  │   │ 226 IDENTIFY A SECURITY POLICY ASSOCIATED WITH THE          │ │  │
│  │   │ FIRST DOCUMENT STRUCTURE, THE SECURITY POLICY               │ │  │
│  │   │ PREVENTING A DOWNLOADING OF THE FIRST DOCUMENT              │ │  │
│  │   │ STRUCTURE PRIOR TO A DOWNLOAD REQUEST FROM THE              │ │  │
│  │   │ USER                                                        │ │  │
│  │   └─────────────────────────────────────────────────────────────┘ │  │
│  └───────────────────────────────────────────────────────────────────┘  │
└─────────────────────────────────────────────────────────────────────────┘
```

FIG. 7

```
┌─────────────────────────────────────────────────────────────────────┐
│ 227 PRIORITIZE A DOWNLOAD OF THE AT LEAST ONE FIRST DOCUMENT        │
│ STRUCTURE AND THE AT LEAST ONE SECOND DOCUMENT STRUCTURE BASED      │
│ ON THE CURRENT INTERACTION ASSOCIATED WITH THE FIRST DOCUMENT       │
│                                                                     │
│   ┌─────────────────────────────────────────────────────────────┐   │
│   │  ┌───────────────────────────────────────────────────────┐  │   │
│   │  │ 228 IDENTIFY THE AT LEAST ONE FIRST DOCUMENT STRUCTURE│  │   │
│   │  │ ASSOCIATED WITH THE CURRENT INTERACTION ASSOCIATED    │  │   │
│   │  │ WITH THE FIRST DOCUMENT                               │  │   │
│   │  └───────────────────────────────────────────────────────┘  │   │
│   │                            │                                │   │
│   │                            ▼                                │   │
│   │  ┌───────────────────────────────────────────────────────┐  │   │
│   │  │ 229 DOWNLOAD THE AT LEAST ONE FIRST DOCUMENT          │  │   │
│   │  │ STRUCTURE PRIOR TO AT LEAST ONE OTHER FIRST DOCUMENT  │  │   │
│   │  │ STRUCTURE NOT ASSOCIATED WITH THE CURRENT             │  │   │
│   │  │ INTERACTION ASSOCIATED WITH THE FIRST DOCUMENT        │  │   │
│   │  └───────────────────────────────────────────────────────┘  │   │
│   │                            │                                │   │
│   │                            ▼                                │   │
│   │  ┌───────────────────────────────────────────────────────┐  │   │
│   │  │ 230 DOWNLOAD THE AT LEAST ONE FIRST DOCUMENT          │  │   │
│   │  │ STRUCTURE PRIOR TO THE AT LEAST ONE SECOND DOCUMENT   │  │   │
│   │  │ STRUCTURE                                             │  │   │
│   │  └───────────────────────────────────────────────────────┘  │   │
│   └─────────────────────────────────────────────────────────────┘   │
│                                                                     │
│                                  OR                                 │
│                                                                     │
│   ┌─────────────────────────────────────────────────────────────┐   │
│   │ 231 DURING THE PRIORITIZING OF THE DOWNLOAD OF THE AT LEAST │   │
│   │ ONE FIRST DOCUMENT STRUCTURE, DIFFERENTIATE BETWEEN:        │   │
│   │ i) RECEIVING A REQUEST FROM A USER TO RETRIEVE THE AT LEAST │   │
│   │ ONE FIRST DOCUMENT STRUCTURE                                │   │
│   │ ii) ANTICIPATING RECEIPT OF A REQUEST FOR THE AT LEAST ONE  │   │
│   │ FIRST DOCUMENT STRUCTURE                                    │   │
│   └─────────────────────────────────────────────────────────────┘   │
└─────────────────────────────────────────────────────────────────────┘
```

*FIG. 8*

METHODS AND APPARATUS FOR OPTIMIZING RESPONSIVENESS OF PORTABLE DOCUMENTS

CROSS REFERENCE TO RELATED APPLICATIONS

This patent application is related to U.S. Pat. No. 6,073,148 filed on Jun. 6, 2000 entitled, "DISPLAYING ELECTRONIC DOCUMENTS WITH SUBSTITUTE FONTS", the contents and teachings of which are hereby incorporated by reference in their entirety.

BACKGROUND

Conventional computerized devices, such as personal computers, laptop computers, and the like enable users to access (i.e., download) documents. Documents can be stored locally (i.e., on the hard drive of the a computer), or remotely, such as on a server. A server can be a local area network, available only to a particular group of users. A server can also be a publicly available server, such as the Internet.

When a user accesses a document residing on a server, typically a copy of that document is downloaded from the server to a cache on the user's computer. The time necessary for the download to occur can depend on a number of different factors, such as the connection speed of the user's computer, the bandwidth of the server, etc.

Documents can be made up of document structures. A document structure can be, for example, pages, images, annotations, structure tree, help modules, etc. Typically, document structures can be downloaded as they are needed. However, once a download begins, the download continues until it is finished, regardless of the other document structures that may be need to be downloaded.

A portable document is a document that is self-contained, and portable across any platform. That is, everything (i.e., document structures, etc.) needed to view the document (i.e., fonts, images, etc.) is bundled into the document. All users will see the same document even when viewed with different computers, different operating systems, different document viewers, etc. Essentially, the document appears the same on virtually any viewer or printed out on paper. A document that is in Portable Document Format (PDF) is an example of a portable document.

SUMMARY

Conventional technologies for downloading portable documents, or downloading document structures associated with portable documents, suffer from a variety of deficiencies. In particular, conventional technologies related to downloading portable documents, or downloading document structures are limited in that conventional technologies download the document structures as they are needed, requiring a user to wait until the document structure has completed the download, prior to utilizing that document structure. Conventional technologies also pre-fetch document structures when there are available resources to perform the download. Once a download has started, conventional technologies do not interrupt the download until the download has finished. Thus, a request to download a document or a document structure that may be more pressing than the current download must wait until the current download has completed. Conventional technologies base the decision of when to download documents and document structures on crude methods involving the size of file, the available speed of a user's computer, and the available bandwidth of the server. Thus, there is no coordination of prioritizing downloads when multiple documents are opened.

Embodiments disclosed herein significantly overcome such deficiencies and provide a system that includes a computer system executing a portable document downloading process that optimizes performance and responsiveness of portable documents on slow file systems, such as the Internet by, taking advantage of deep knowledge of document structures, connection speed, and other factors. The portable document downloading process decides the best strategy, at any point, to download a document, or document structure, with the goal of minimizing the time required to download a document in its entirety while providing the optimal user responsiveness. The portable document downloading process pre-fetches document structures that may be needed while assuring that the pre-fetching does not interfere with downloading parts of the document (i.e., document structures) that are needed immediately to respond to direct user actions. The portable document downloading process coordinates which document structures are downloaded at any time, using knowledge of whether the data is needed immediately (or might be needed), the speed of the connection, and the speed of a particular server. The portable document downloading process also maintains a status of in-progress downloads in such a way as to allow the portable document downloading process to selectively pause a pre-fetched download so as to allow the full bandwidth available to be applied to download document structures that are needed immediately.

The portable document downloading process coordinates bandwidth usage when more than one document is open at a time, and collects information about the connection speed in order to make ad hoc decisions about the optimal use of the available bandwidth. The portable document downloading process collects information about the user's connection speed, and also of particular servers' bandwidth information, when possible, on an ongoing basis. In one embodiment, this data is collected on all document types that are downloaded to the user's computer, not just portable document types.

When a document is opened in a portable document viewer, the portable document downloading process notes the file size and the current connection speed. In one embodiment, the speed of a particular server is noted as well. The portable document downloading process determines whether it would be optimal to download the entire document or to byte range request parts of the document. The decision is made based on heuristics associated with the file size, the connection bandwidth, and if available, the bandwidth of downloads from the targeted server. If the decision by the portable document downloading process is to download the entire document, the download is handled by the portable document downloading process, and hidden from the other parts of the portable document viewer. The portable document downloading process also notes the current document with which the user is interacting, and prioritizes its downloads accordingly. Any current downloads that are associated with documents not associated with the user's current focus are paused. It should be noted that only downloads for document structures that might be needed may be paused. The portable document downloading process maintains information associated with the paused download, and restarts the download at a later time when the download does not interfere with downloading document structures that are needed to respond to a user request.

The portable document downloading process maintains a status of which document structures are local in the cache (of the user's computer), and which document structures have yet to be requested. When a portable document is opened, the portable document downloading process receives requests from different parts of the portable document viewer to prefetch parts of the document structure. The portable document downloading process also receives requests for document structures that are needed immediately to respond to actions by the user. These requests are given a higher priority to optimize responsiveness to the user. If the portable document downloading process has determined the document should be byte range requested, the portable document downloading process opens a connection with the server, and begins to download the document structures that are needed immediately. Once those document structures are downloaded, the portable document downloading process opens another connection with the server, and begins to download document structures that may be needed (i.e., pre-fetching document structures). The portable document downloading process can also pre-fetch document structures for other documents that are currently opened. While a user is interacting with the document, if, at any point, a user's request causes document structures to be needed, that are not in the cache, the portable document downloading process can pause any pre-fetch download, freeing up the available bandwidth to download the document structures that are needed immediately. While a user is interacting with the document, if, at any point, a user's action causes structures that were needed to no longer be needed, the portable document downloading process can reclassify them as structures that might be needed, and thus, may subsequently pause the download of those structures.

In an example embodiment, the portable document downloading process allows for a configurable cache. As part of the speculative downloading of documents and document structures, the portable document downloading process pre-fetches documents and document structures. Some security policies prevent documents and document structures from being pre-fetched. Thus, the portable document downloading process has the capability to identify a security policy and selectively configure the cache in accordance with the security policy.

The portable document downloading process detects a requirement to obtain a first document by the computer system. The first document has a predefined format. The portable document downloading process identifies a sequence of portions of the first document to obtain based on analysis of the predefined format of the first document, and analysis of current operational parameters of the computer system. The portable document downloading process obtains and, and in some cases, renders a first portion of the first document from the identified sequence, and obtains successive portions of the first document in accordance with the identified sequence.

During an example operation of one embodiment, suppose a user downloads a portable document from a server. The portable document downloading process, anticipating the user will open the document at the first page, downloads the first page of the document such that the response time of the document download is optimized, and the user is quickly presented with the first page of the document. The portable document downloading process, anticipating that the user will 'page down' to request the second page of the document, begins to download the second page of the document. During the downloading of the second page of the document, the user requests the tenth page of the document. The portable document downloading process pauses the download of the second page of the document, and immediately begins downloading the tenth page of the document, in response to the user's request. At a later time, the portable document downloading process resumes the download of the second page of the document. The portable document downloading process maintains a status of which document structures have been downloaded.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 illustrates a flowchart of a procedure performed by the system of FIG. 1, when the portable document downloading process evaluates current operational parameters associated with the first document and the computer system to identify at least a portion of the first document to obtain, according to one embodiment disclosed herein.

FIG. 4 illustrates a flowchart of a procedure performed by the system of FIG. 1, when the portable document downloading process evaluates current operational parameters associated with the first document and the computer system to identify at least a portion of the first document to obtain, and identifies at least one second document including at least one second document structure, according to one embodiment disclosed herein.

FIG. 6 illustrates a flowchart of a procedure performed by the system of FIG. 1, when the portable document downloading process identifies at least one first document structure associated with the first document, according to one embodiment disclosed herein.

FIG. 7 illustrates a flowchart of a procedure performed by the system of FIG. 1, when the portable document downloading process identifies at least one first document structure associated with the first document, and anticipates receipt of a request for the at least one first document structure, according to one embodiment disclosed herein.

FIG. 8 illustrates a flowchart of a procedure performed by the system of FIG. 1, when the portable document downloading process prioritizes a download of the at least one first document structure and the at least one second document structure based on the current interaction associated with the first document, according to one embodiment disclosed herein.

DETAILED DESCRIPTION

Figure 1:
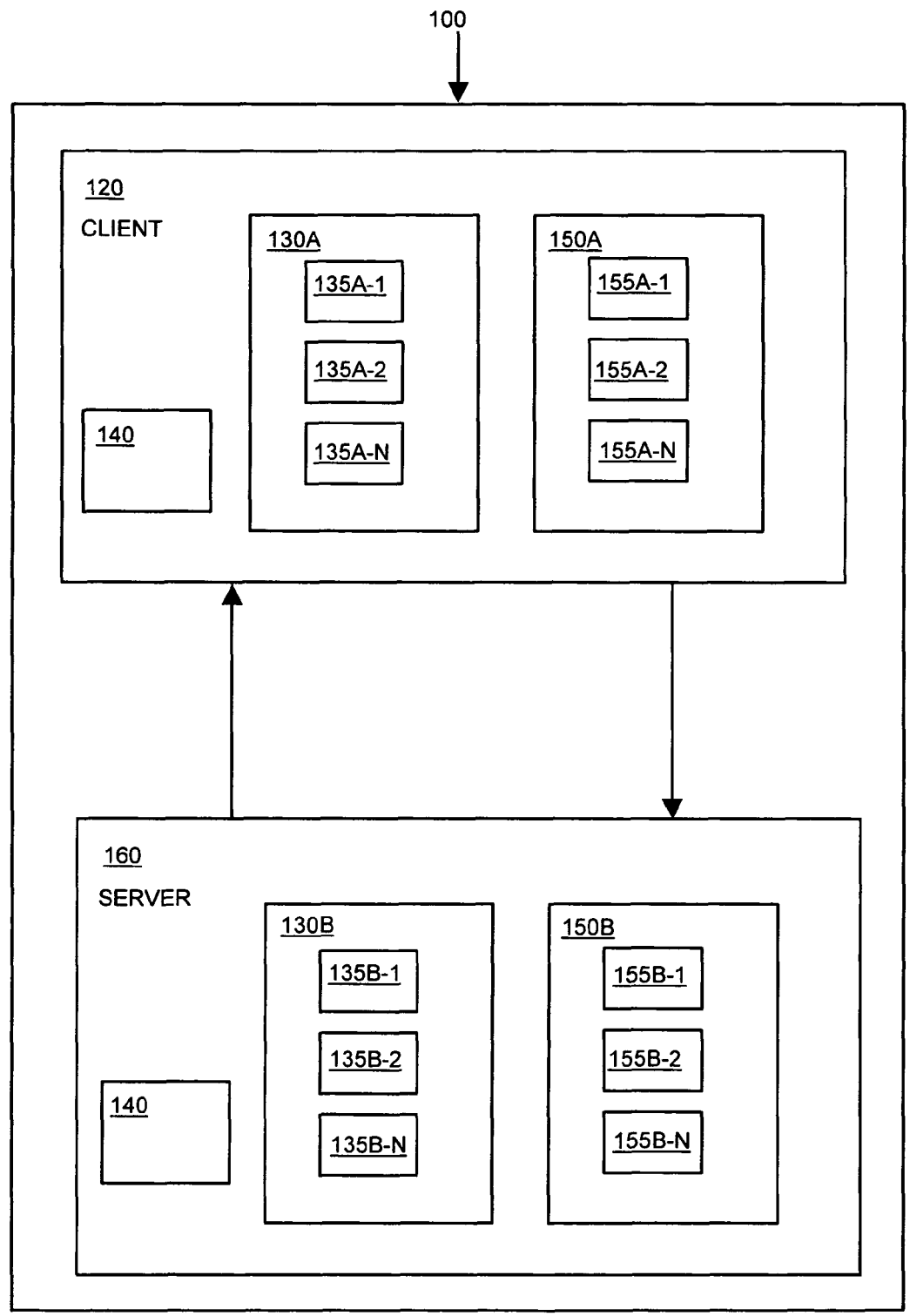
FIG. 1 shows a high level view of a document editor according to one embodiment disclosed herein.

Embodiments disclosed herein include a computer system executing a portable document downloading process that optimizes performance and responsiveness of portable documents on slow file systems, such as the Internet by, taking advantage of deep knowledge of document structures, connection speed, and other factors. The portable document downloading process decides the best strategy, at any point, to download a document, or document structure, with the goal of minimizing the time required to download a document in its entirety while providing the optimal user responsiveness. The portable document downloading process pre-fetches document structures that may be needed while assuring that the pre-fetching does not interfere with downloading parts of the document (i.e., document structures) that are needed immediately to respond to direct user actions. The portable document downloading process coordinates which document structures are downloaded at any time, using knowledge of whether the data is needed immediately (or might be needed), the speed of the connection, and the speed of a particular server. The portable document downloading process also maintains a status of in-progress downloads in such a way as to allow the portable document downloading process to selectively pause a pre-fetched download so as to allow the full bandwidth available to be applied to download document structures that are needed immediately.

The portable document downloading process coordinates bandwidth usage when more than one document is open at a time, and collects information about the connection speed in order to make ad hoc decisions about the optimal use of the available bandwidth. The portable document downloading process collects information about the user's connection speed, and also of particular servers' bandwidth information, when possible, on an ongoing basis. In one embodiment, this data is collected on all document types that are downloaded to the user's computer, not just portable document types.

When a document is opened in a portable document viewer, the portable document downloading process notes the file size and the current connection speed. In one embodiment, the speed of a particular server is noted as well. The portable document downloading process determines whether it would be optimal to download the entire document or to byte range request parts of the document. The decision is made based on heuristics associated with the file size, the connection bandwidth, and if available, the bandwidth of downloads from the targeted server. If the decision by the portable document downloading process is to download the entire document, the download is handled by the portable document downloading process, and hidden from the other parts of the portable document viewer. The portable document downloading process also notes the current document with which the user is interacting, and prioritizes its downloads accordingly. Any current downloads that are associated with documents not associated with the user's current focus are paused. It should be noted that only downloads for document structures that might be needed may be paused. The portable document downloading process maintains information associated with the paused download, and restarts the download at a later time when the download does not interfere with downloading document structures that are needed to respond to a user request.

The portable document downloading process maintains a status of which document structures are local in the cache (of the user's computer), and which document structures have yet to be requested. When a portable document is opened, the portable document downloading process receives requests from different parts of the portable document viewer to pre-fetch parts of the document structure. The portable document downloading process also receives requests for document structures that are needed immediately to respond to actions by the user. These requests are given a higher priority to optimize responsiveness to the user. If the portable document downloading process has determined the document should be byte range requested, the portable document downloading process opens a connection with the server, and begins to download the document structures that are needed immediately. Once those document structures are downloaded, the portable document downloading process opens another connection with the server, and begins to download document structures that may be needed (i.e., pre-fetching document structures). The portable document downloading process can also pre-fetch document structures for other documents that are currently opened. While a user is interacting with the document, if, at any point, a user's request causes document structures to be needed, that are not in the cache, the portable document downloading process can pause any pre-fetch download, freeing up the available bandwidth to download the document structures that are needed immediately. While a user is interacting with the document, if, at any point, a user's action causes structures that were needed to no longer be needed, the portable document downloading process can reclassify them as structures that might be needed, and thus, may subsequently pause the download of those structures.

In an example embodiment, the portable document downloading process allows for a configurable cache. As part of the speculative downloading of documents and document structures, the portable document downloading process pre-fetches documents and document structures. Some security policies prevent documents and document structures from being pre-fetched. Thus, the portable document downloading process has the capability to identify a security policy and selectively configure the cache in accordance with the security policy.

The portable document downloading process detects a requirement to obtain a first document by the computer system. The first document has a predefined format. The portable document downloading process identifies a sequence of portions of the first document to obtain based on analysis of the predefined format of the first document, and analysis of current operational parameters of the computer system. The portable document downloading process obtains and, and in some cases, renders a first portion of the first document from the identified sequence, and obtains successive portions of the first document in accordance with the identified sequence.

FIG. 1 is a block diagram illustrating example architecture of a computer system 100 that includes a client 120 in communication with a server 160. In an example embodiment, the portable document downloading process 140 resides on the client 120. In another embodiment, the portable document downloading process 140 resides on the server 160. In yet another example embodiment, the client 120 and server 160 reside on the same computer system 100. The server 160 contains a plurality of portable documents, including a first document 130B and a second document 150B. The first document 130B is comprised of a plurality of first document structures 135$b$-N. Likewise, The second document 150B is comprised of a plurality of document structures 155$b$-1 through 155$b$-N. A request, from the client 120, for the first document 130B on the server 160, results in a copy of the first document 130B downloaded to the client 120 in the form of the first document 130A (including copies of the plurality of first document structures 135$b$-1 through 135$b$-N). Likewise, a request, from the client 120, for the second document 150B on the server 160, results in a copy of the second document 150B downloaded to the client 120 in the form of the second document 150A (including the plurality of document structures 155$a$-1 through 155$a$-N).

The portable document downloading process 140 may be embodied as software code such as data and/or logic instructions (e.g., code stored in the memory or on another computer readable medium such as a removable disk) that supports processing functionality according to different embodiments described herein.

It is noted that example configurations disclosed herein include the portable document downloading process 140 itself (i.e., in the form of un-executed or non-performing logic instructions and/or data). The portable document downloading process 140 may be stored as an application on a computer readable medium (such as a floppy disk, hard disk, electronic, magnetic, optical, or other computer readable medium). The portable document downloading process 140 may also be stored in a memory system such as in firmware, read only memory (ROM), or, as in this example, as executable code in, for example, Random Access Memory (RAM). Those skilled in the art will understand that the client 120 and server 160 may include other processes and/or software and hardware components, such as an operating system not shown in this example.

Further details of configurations explained herein will now be provided with respect to a flow chart of processing steps that show the high level operations disclosed herein to perform the portable document downloading process 140.

Figure 2:
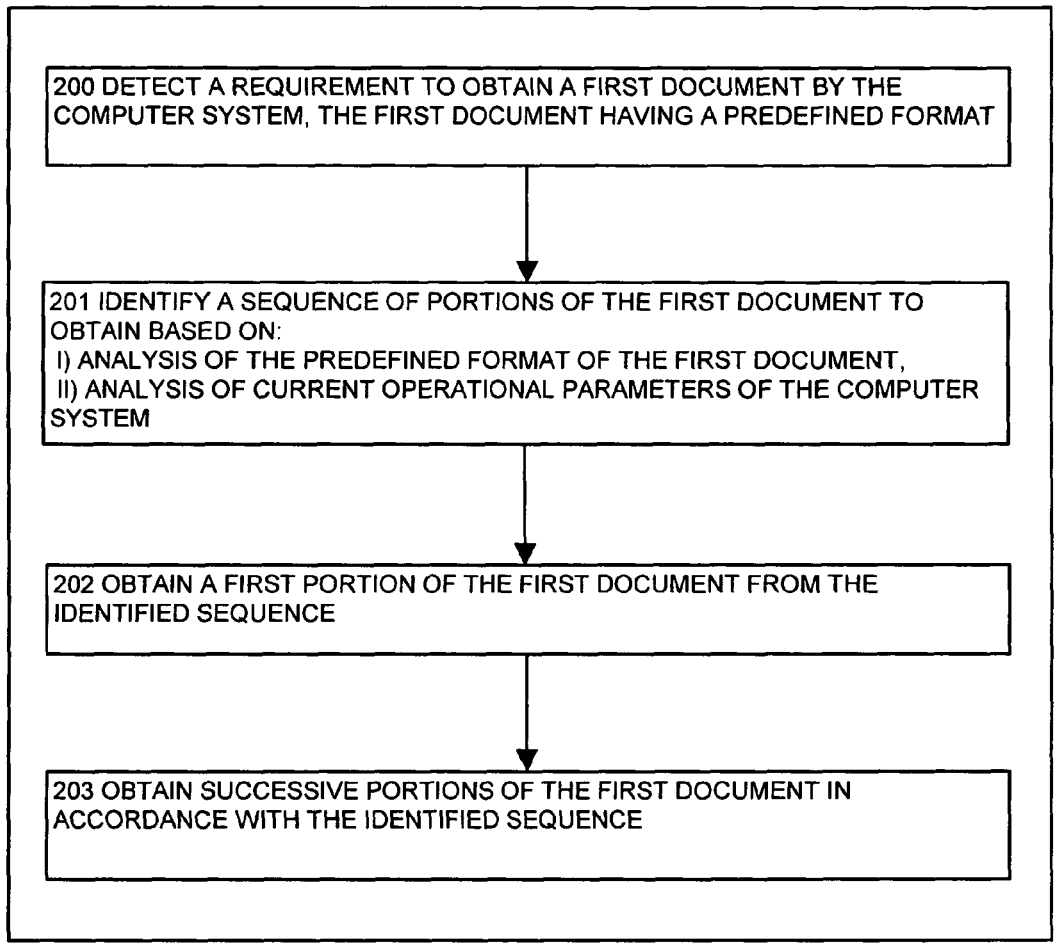
FIG. 2 illustrates a flowchart of a procedure performed by the system of FIG. 1, when the portable document downloading process detects a requirement to obtain a first document by the computer system, the first document having a predefined format, according to one embodiment disclosed herein.

FIG. 2 is an embodiment of the steps performed by the portable document downloading process 140 when it detects a requirement to obtain a first document 130 by the computer system 100. The first document 130 has a predefined format.

In step 200, the portable document downloading process 140 detects a requirement to obtain a first document 130 by the computer system 100. The first document 130 has a predefined format. The computer system 100 detects a requirement to, for example, download a first document 130 from the server 160 to the client 120. The request may originate from a user who performs an action within a document viewer that causes a request to be transmitted from the client 120 to the server 160. The request may also originate from the portable document downloading process 140 for a portion of the first document 130 that the portable document downloading process 140 anticipates a user may request. For example, a user navigates to a directory on the server 160, and performs an action (such as selecting the first document 130 from a plurality of documents within the directory) to obtain the first document 130. In another embodiment, the user may select a hyperlink from a website to view a first document 130 that is accessed via a hyperlink on the website.

In step 201, the portable document downloading process 140 identifies a sequence of portions of the first document 130 to obtain based on analysis of the predefined format of the first document 130, and analysis of current operational parameters of the computer system 100. The first document 130 is comprised of first document structures 135-N. The portable document downloading process 140 collects information, for example, about the connection speed of the client 120, and the server's 160 bandwidth information, on an ongoing basis.

In step 202, the portable document downloading process 140 obtains a first portion of the first document 130 from the identified sequence. The decision to download the portion of the first document 130 is based, on, for example, heuristics associated with the file size of the first document 130, the connection bandwidth of the client 120, and if available, the bandwidth of downloads from the server 160. In an example embodiment, the portable document downloading process 140 obtains and renders a first portion of the first document 130 from the identified sequence.

In step 203, the portable document downloading process 140, obtain successive portions of the first document 130 in accordance with the identified sequence. In an example embodiment, while a user is interacting with the first portion of the first document 130, the portable document downloading process 140 obtains the remaining portions of the first document 130 such that they are available when the user requires those portions.

FIG. 3 is an embodiment of the steps performed by the portable document downloading process 140 when it identifies a sequence of portions of the first document 130 to obtain based on analysis of the predefined format of the first document 130, and analysis of current operational parameters of the computer system.

In step 204, the portable document downloading process 140 identifies a sequence of portions of the first document 130 to obtain based on analysis of the predefined format of the first document 130, and analysis of current operational parameters of the computer system. For example, the portable document downloading process 140 evaluates the file size of the first document 130, the connection bandwidth associated with the client 120, the bandwidth of downloads from the server 160, etc. The portable document downloading process 140 utilizes this information when determining whether to download the entire first document 130 or a portion of the first document 130, for example, the first page of the first document 130.

In step 205, the portable document downloading process 140 assesses a size associated with the first document 130.

The portable document downloading process 140 is capable of assessing the size of the first document 130 prior to the first document being downloaded from the server 160 to the client 120. The size of the first document 130 and the bandwidth of the client 120 factor into the portable document downloading process 140's decision to download the first document 130 in its entirety.

In step 206, the portable document downloading process 140 identifies at least one first document structure 135-1 associated with the first document 130. The first document is comprised of a plurality of first document structures 135-N. First document structures 135-N can include objects, images, help menus, etc.

In step 207, the portable document downloading process 140 collects first document structure information associated with the at least one first document structure 135-1. The portable document downloading process 140 has complete knowledge of the first document structures 135-N such as pages, annotations, structure tree, etc, including where those documents structures 135-N are physically located. The first document structure information includes at least one of:

i) a location associated with the at least one first document structure 135-1 ii) a size associated with the at least one first document structure 135-1.

Alternatively, in step 208, the portable document downloading process 140 identifies a connection between the computer system 100 and at least one other computer system (not shown). The portable document downloading process 140 takes advantage of the computer system's 100 ability to open simultaneous connections between the client 120 and the server 160, or between the client 120 and multiple other servers (not shown).

FIG. 4 is an embodiment of the steps performed by the portable document downloading process 140 when it identifies a sequence of portions of the first document 130 to obtain based on analysis of the predefined format of the first document 130, and analysis of current operational parameters of the computer system.

In step 209, the portable document downloading process 140 identifies a sequence of portions of the first document 130 to obtain based on analysis of the predefined format of the first document 130, and analysis of current operational parameters of the computer system.

In step 210, the portable document downloading process 140 identifies at least one second document 150, including at least one second document structure 155-1. When a first document 130 is opened within a document viewer on the client 120, the portable document downloading process 140 has knowledge of any other documents that are opened on the client 120, such as a second document 150. A second document 150, just like the first document 130, is comprised of a plurality of second document structures 155-N.

In step 211, the portable document downloading process 140 identifies a request to obtain at least one second document structure 155-1 in conjunction with obtaining at least a portion of the first document 130. In other words, the portable document downloading process 140 handles multiple requests on the client 120, such as a request for a second document structure 155-1 associated with a second document 150, along with requests for first document structures 130-N associated with a first document 130. The portable document downloading process 140 uses the identified current operational parameters, and heuristics, to prioritize the requested downloads and speculatively download (i.e., pre-fetched) those document structures that have not yet been requested.

In step 212, the portable document downloading process 140 identifies a capacity associated with the computer system 100, the capacity including at least one of:

i) a network availability associated with the computer system 100 ii) a transfer speed associated with the computer system, the transfer speed associated with obtaining at least one document.

Figure 5:
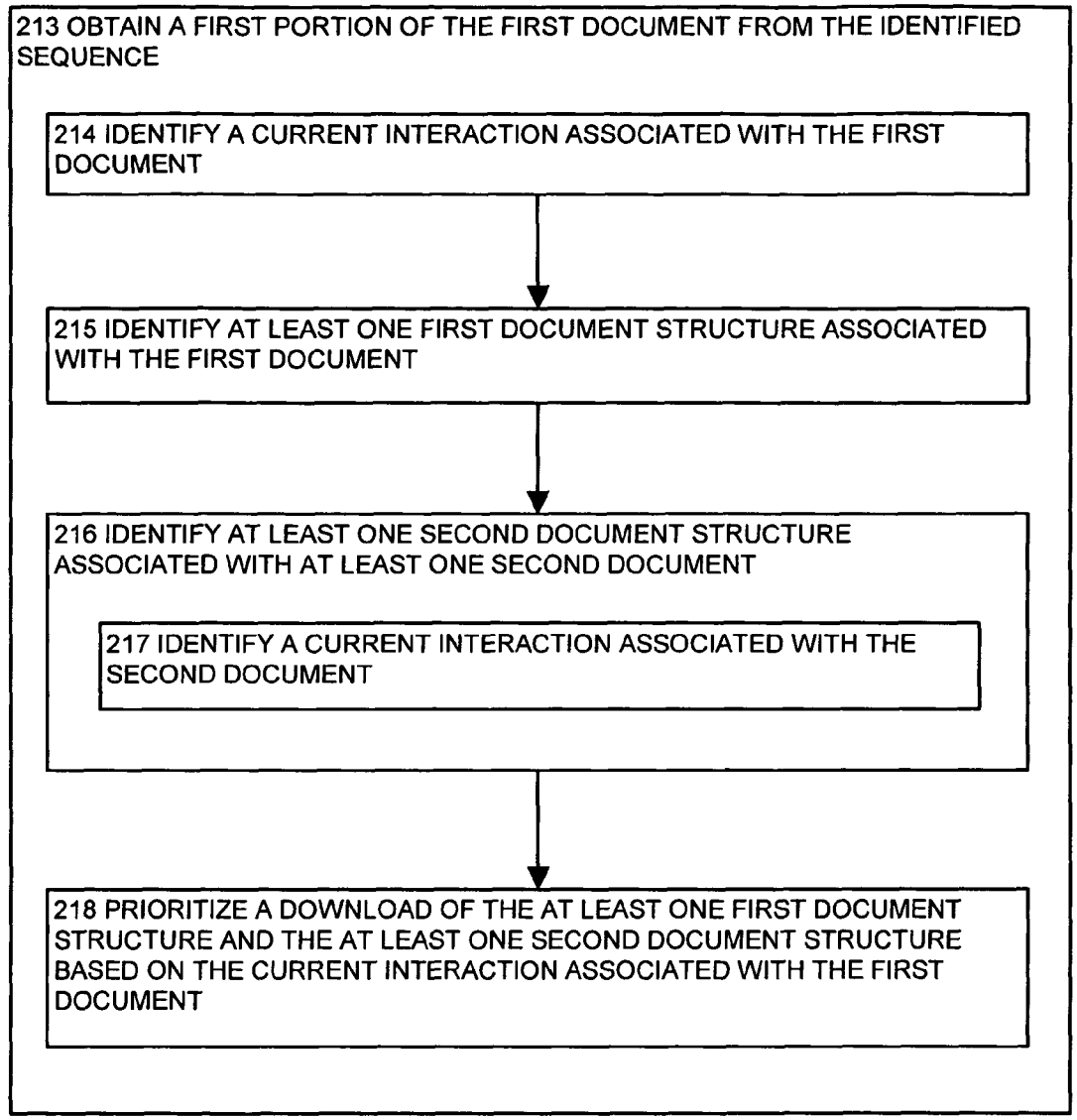
FIG. 5 illustrates a flowchart of a procedure performed by the system of FIG. 1, when the portable document downloading process obtains a first portion of the first document from the identified sequence, according to one embodiment disclosed herein.

FIG. 5 is an embodiment of the steps performed by the portable document downloading process 140 when it obtains a first portion of the first document 130 from the identified sequence.

In step 213, the portable document downloading process 140 obtains a first portion of the first document 130 from the identified sequence. After evaluating the current operational parameters associated with the first document 130 and the computer system 100, the portable document downloading process 140 determines whether to download the entire first document 130, or at least one first document structure 135-1 or with a byte range request.

In step 214, the portable document downloading process 140 identifies a current interaction associated with the first document 130. The portable document downloading process 140 identifies that a user is currently interacting with the first document 130. For example, the portable document downloading process 140 may have downloaded the first page of the first document 130 in response to a request from the user.

In step 215, the portable document downloading process 140 identifies at least one first document structure 135-1 associated with the first document. For example, the user may be interacting with the first page of the first document 130 and the portable document downloading process 140 identifies first document structures 135-N associated with the second page of the first document 130 that may be requested.

In step 216, the portable document downloading process 140 identifies at least one second document structure 155-1 associated with at least one second document 150. Just as the first document 130 is comprised of first document structures 135-N, the second document 150 is comprised of second document structures 155-N.

In step 217, the portable document downloading process 140 identifies a current interaction associated with the second document 150. The portable document downloading process 140 identifies that there are multiple documents opened on the client 120 and that a user may be interacting simultaneously with multiple documents.

In step 218, the portable document downloading process 140 prioritizes a download of at least one first document structure 135-N and at least one second document structure 155-N, based on the current interaction associated with the first document 130. The portable document downloading process 140 identifies that multiple documents are opened on the client 120, resulting in multiple requests for first document structures 135-N and second document structures 155-N. Based on the current interaction with the first document 130 by a user, the portable document downloading process 140 prioritizes the download of the first document structures 135-N. In other words, since the user is currently interacting with the first document 130, the first document structures 135-N receive download priority over the second document structures 155-N associated with the second document 150 (that is also opened on the client 120).

FIG. 6 is an embodiment of the steps performed by the portable document downloading process 140 when it identifies at least one first document structure 135-1 associated with the first document 130.

In step 219, the portable document downloading process 140 identifies at least one first document structure 135-1 associated with the first document 130. The first document 130 is comprised of a plurality of first document structures 135-N, such as fonts, images, annotations, etc.

In step 220, the portable document downloading process 140 receives a request from a user to retrieve at least one first document structure. For example, a user is viewing the first page of the first document 130, and pages down to view the second page. Thus, the portable document downloading process 140 receives a request for the second page of the first document 130. That request has originated from a user, as opposed to requests for first document structures 135-N that originate from the portable document downloading process 140, based on the evaluation of the current operational parameters associated with the first document 130, and the computer system 100.

In step 221, the portable document downloading process 140 maintains a status associated with at least one first document structure 135-N. The status identifies whether the first document structure 135-N has begun a download (i.e., whether the first document structure 135-N has been downloaded, or whether the download is currently occurring). The portable document downloading process 140 keeps track of which first document structures 135-N have been pre-fetched, which first document structures 135-N have not, and which are in the process of being fetched.

FIG. 7 is an embodiment of the steps performed by the portable document downloading process 140 when it identifies at least one first document structure 135-N associated with the first document 130.

In step 223, the portable document downloading process 140 identifies at least one first document structure 135-N associated with the first document 130. The first document 130 is comprised of a plurality of first document structures 135-N, such as pages, annotations, structure tree, etc.

In step 224, the portable document downloading process 140 anticipates receipt of a request, for at least one first document structure 135-1. In an example embodiment, the user has requested the first document 130 and is viewing the first page of the first document 130. The portable document downloading process 140 anticipates that the user will request the second page of the first document 130, and the portable document downloading process 140 identifies those first document structures 135-N associated with the second page of the first document 130.

In step 225, the portable document downloading process 140 anticipates receipt of a request from a user based on a request history associated with the user. The portable document downloading process 140 determines which first document structures 135-N to download for the user, based on the user's access history. For example, the user frequently uses the help menus. Thus, the portable document downloading process 140 anticipates that the user will utilize the help menus, and the portable document downloading process 140 begins to download those first document structures 135-N associated with the help menus (for the first document 130) prior to the user requesting those help menus.

In step 226, the portable document downloading process 140 identifies a security policy associated with the first document structure 135-N. The security policy prevents a downloading of the first document structure 135-N prior to a download request from the user. The portable document downloading process 140 allows for a configurable cache. As part of the speculative downloading of documents and document structures, the portable document downloading process 140 pre-fetches documents and document structures. Some security policies prevent documents and document structures from being pre-fetched, and stored in a cache. Thus, the portable document downloading process 140 has the capability to identify a security policy and selectively configure the cache in accordance with the security policy, such that documents and/or document structures are not pre-fetched.

FIG. 8 is an embodiment of the steps performed by the portable document downloading process 140 when it prioritizes a download of at least one first document structure 135-N, and at least one second document structure 155-N, based on the current interaction associated with the first document 130.

In step 227, the portable document downloading process 140 prioritizes a download of at least one first document structure 135-N and at least one second document structure 155-N based on the current interaction associated with the first document 130. If both the first document 130 and the second document 150 are opened on the client 120, the portable document downloading process 140 prioritizes requests for document structures associated with either document, based on the document with which a user is currently interacting.

In step 228, the portable document downloading process 140 identifies at least one first document structure 135-N associated with the current interaction associated with the first document 130. The portable document downloading process 140 identifies that the user is currently interacting with, for example, the first document 130. The portable document downloading process 140 identifies a plurality of first document structures 135-N associated with the first document 130.

In step 229, the portable document downloading process 140 downloads at least one first document structure 135-1 prior to at least one other first document structure 135-2 not associated with the current interaction associated with the first document 130. Among the plurality of first document structures 135-N, not all of them will be associated with the current interaction with the first document 130. For example, the help menus are a first document structure 135-3 associated with the first document 130. However, until the user accesses the help menus, there does not exist a current interaction with that particular first document structure 135-3. The portable document downloading process 140 identifies which first document structures 135-N from the plurality of first document structures 135-N are needed to satisfy any requests from the user.

In step 230, the portable document downloading process 140 downloads at least one first document structure 135-1 prior to at least one second document structure 155-1. Based on the current interaction with the first document 130 by the user, the portable document downloading process 140 prioritizes the downloads and downloads the first document structures 135-N prior to downloading any second document structures 155-N. In other words, the user may have the first document 130 and the second document 150 opened on the client 120. Both the first document 130 and the second document 150 have associated first document structures 135-N and second document structures 155-N, respectively. The portable document downloading process 140 identifies that the user is interacting with the first document structures 135-N associated with the first document 130, and not the second document structures 155-N associated with the second document 150. Thus, the portable document downloading process 140 downloads the first document structure 135-1 prior to downloading the second document structure 155-1.

During the prioritizing of the download of at least one first document structure 135-N, in step 231, the portable document downloading process 140 differentiates between:

i) receiving a request from a user to retrieve at least one first document structure 135-1 ii) anticipating receipt of a request for at least one first document structure 135-1.

Figure 9:
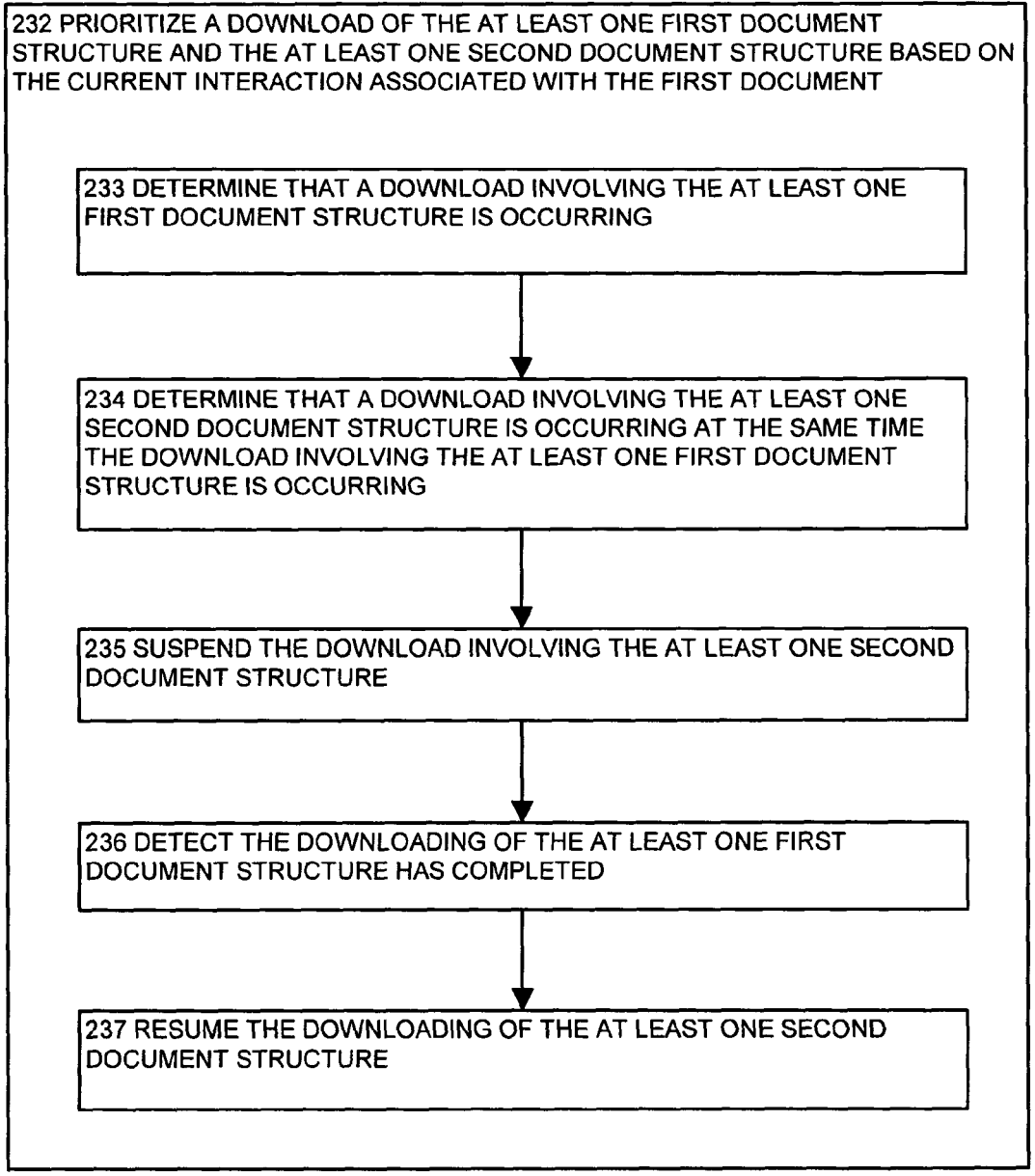
FIG. 9 illustrates a flowchart of a procedure performed by the system of FIG. 1, when the portable document downloading process prioritizes a download of the at least one first document structure and the at least one second document structure based on the current interaction associated with the first document, and determines that a download involving the at least one first document structure is occurring, according to one embodiment disclosed herein.

FIG. 9 is an embodiment of the steps performed by the portable document downloading process 140 when it prioritizes a download of at least one first document structure 135-1, and at least one second document structure 155-1, based on the current interaction associated with the first document 130.

In step 232, the portable document downloading process 140 prioritizes a download of at least one first document structure 135-1, and at least one second document structure 155-1, based on the current interaction associated with the first document 130. The current interaction of the user with the first document 130 gives any downloads of first document structures 135-N priority over the downloading of any second document structures 155-N. Should the current interaction of the user shift from the first document 130 to the second document 150, the downloading of the second document structures 155-N would take priority over the downloading of the first document structures 135-N.

In step 233, the portable document downloading process 140 determines that a download involving at least one first document structure 135-1 is occurring. In an example embodiment, the download is a result of a request from the user. In another example embodiment, the download is a result of the portable document downloading process 140 speculatively downloading (i.e., pre-fetching) the first document structures 135-1 in anticipation of a request from the user.

In step 234, the portable document downloading process 140 determines that a download involving at least one second document structure 155-1 is occurring at the same time the download involving at least one first document structure 135-1 is occurring.

In step 235, the portable document downloading process 140 suspends the download involving the at least one second document structure 155-1 such that the first document structure 135-1 (which has been determined by the portable document downloading process 140 to have a higher priority than the second document structure 155-1) can download more quickly.

In step 236, the portable document downloading process 140 detects the downloading of at least one first document structure 135-1 has completed.

In step 237, the portable document downloading process 140 resumes the downloading of at least one second document structure 155-1. The portable document downloading process 140 selectively pauses downloads to allow those first document structures 135-N that are currently needed, to complete. Once those downloads have completed, the portable document downloading process 140 resumes the download of any downloads that were paused.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. In a computer system, a method comprising:
    detecting a requirement to obtain a first document by the computer system, the first document having a predefined format;
    identifying a sequence of portions of the first document to obtain based on:
        i) analysis of the predefined format of the first document; and
        ii) analysis of current operational resources available to the computer system;
    obtaining a first portion of the first document from the identified sequence; and
    obtaining successive portions of the first document in accordance with the identified sequence;
    wherein obtaining a first portion of the first document comprises:
        identifying a current interaction associated with the first document;
        identifying at least one first document structure associated with the first document;
        identifying at least one second document structure associated with at least one second document; and
        automatically prioritizing a download of the at least one first document structure and the at least one second document structure based on the current interaction associated with the first document;
    wherein prioritizing the download comprises:
        determining that a download involving the at least one first document structure is occurring;
        determining that a download involving the at least one second document structure is occurring at the same time the download involving the at least one first document structure is occurring; and
        suspending the download involving the at least one second document structure.

2. The method of claim 1 wherein identifying a sequence of portions of the first document to obtain comprises:
    assessing a size associated with the first document;
    identifying at least one first document structure associated with the first document; and
    collecting first document structure information associated with the at least one first document structure, the first document structure information including at least one of:
        i) a location associated with the at least one first document structure; and
        ii) a size associated with the at least one first document structure.

3. The method of claim 1 wherein identifying a sequence of portions of the first document to obtain comprises:
    identifying at least one second document including at least one second document structure; and
    identifying a request to obtain the at least one second document structure in conjunction with obtaining the at least a portion of the first document.

4. The method of claim 1 wherein analysis of current operational resources available to the computer system comprises:
    identifying a capacity associated with the computer system, the capacity including at least one of:
        i) a network availability associated with the computer system; and ii) a transfer speed associated with the computer system, the transfer speed associated with obtaining at least one document.

5. The method of claim 1 wherein analysis of current operational resources available to the computer system comprises:
identifying a connection between the computer system and at least one other computer system.

6. The method of claim 1 wherein identifying at least one second document structure associated with at least one second document comprises:
identifying a current interaction associated with the second document.

7. The method of claim 1 wherein identifying at least one first document structure associated with the first document comprises:
receiving a request from a user to retrieve the at least one first document structure.

8. The method of claim 1 wherein identifying at least one first document structure associated with the first document comprises:
anticipating receipt of a request for the at least one first document structure.

9. The method of claim 8 wherein anticipating receipt of a request for the at least one first document structure comprises:
anticipating receipt of a request from a user based on a request history associated with the user.

10. The method of claim 8 wherein anticipating receipt of a request for the at least one first document structure, the request originating from a user comprises:
identifying a security policy associated with the first document structure, the security policy preventing a downloading of the first document structure prior to a download request from the user.

11. The method of claim 1 wherein identifying at least one first document structure associated with the first document comprises:
maintaining a status associated with the at least one first document structure, the status identifying whether the at least one first document structure has begun a download.

12. The method of claim 1 wherein prioritizing a download of the at least one first document structure and the at least one second document structure based on the current interaction associated with the first document comprises:
identifying the at least one first document structure associated with the current interaction associated with the first document;
downloading the at least one first document structure prior to at least one other first document structure not associated with the current interaction associated with the first document; and
downloading the at least one first document structure prior to the at least one second document structure.

13. The method of claim 1 wherein prioritizing a download of the at least one first document structure and the at least one second document structure based on the current interaction associated with the first document comprises:
during the prioritizing of the download of the at least one first document structure, differentiating between:
i) receiving a request from a user to retrieve the at least one first document structure; and
ii) anticipating receipt of a request for the at least one first document structure.

14. The method of claim 1 comprising:
detecting the downloading of the at least one first document structure has completed; and
resuming the downloading of the at least one second document structure.

15. The method of claim 1 wherein identifying a sequence of portions of the first document to obtain comprises:
identifying an action by a user, the action altering a requirement for at least one portion in the sequence of portions of the first document to obtain; and
modifying the sequence of portions of the first document to obtain to remove the at least one portion from the sequence of portions of the first document to obtain.

16. The method of claim 1 comprising:
determining the current interaction associated with the first document has ceased;
identifying a current interaction with the at least one second document;
suspending the download involving the at least one first document structure; and
resuming the download of the at least one second document structure.

17. A computerized device comprising:
a memory;
a processor;
a communications interface;
an interconnection mechanism coupling the memory, the processor and the communications interface;
wherein the memory is encoded with a portable document downloading application that when executed on the processor is capable of optimizing the downloading of portable documents on the computerized device by performing the operations of:
detecting a requirement to obtain a first document by the computer system, the first document having a predefined format;
identifying a sequence of portions of the first document to obtain based on:
i) analysis of the predefined format of the first document; and
ii) analysis of current operational resources available to the computer system;
obtaining a first portion of the first document from the identified sequence; and
obtaining successive portions of the first document in accordance with the identified sequence;
wherein obtaining a first portion of the first document comprises:
identifying a current interaction associated with the first document;
identifying at least one first document structure associated with the first document;
identifying at least one second document structure associated with at least one second document; and
automatically prioritizing a download of the at least one first document structure and the at least one second document structure based on the current interaction associated with the first document;
wherein prioritizing the download comprises:
determining that a download involving the at least one first document structure is occurring;
determining that a download involving the at least one second document structure is occurring at the same time the download involving the at least one first document structure is occurring; and
suspending the download involving the at least one second document structure.

18. A computer readable medium encoded with computer programming logic that when executed on a processor in a computerized device provides portable document downloading, the medium comprising:

instructions for detecting a requirement to obtain a first document by the computer system, the first document having a predefined format;
instructions for identifying a sequence of portions of the first document to obtain based on:
i) analysis of the predefined format of the first document; and
ii) analysis of current operational resources available to the computer system;
instructions for obtaining a first portion of the first document from the identified sequence; and
instructions for obtaining successive portions of the first document in accordance with the identified sequence;
wherein the instructions for obtaining a first portion of the first document include:
instructions for identifying a current interaction associated with the first document;
instructions for identifying at least one first document structure associated with the first document;
instructions for identifying at least one second document structure associated with at least one second document; and
instructions for automatically prioritizing a download of the at least one first document structure and the at least one second document structure based on the current interaction associated with the first document;
wherein the instructions for prioritizing the download include:
instructions for determining that a download involving the at least one first document structure is occurring;
instructions for determining that a download involving the at least one second document structure is occurring at the same time the download involving the at least one first document structure is occurring; and
instructions for suspending the download involving the at least one second document structure.

19. The computer readable medium of claim 18 wherein program code for identifying a sequence of portions of the first document to obtain comprises:
program code for identifying at least one second document including at least one second document structure; and
program code for identifying a request to obtain the at least one second document structure in conjunction with obtaining the at least a portion of the first document.

20. The computer readable medium of claim 18 wherein program code for identifying at least one first document structure associated with the first document comprises program code for anticipating receipt of a request for the at least one first document structure.

21. The computer readable medium of claim 20 wherein program code for anticipating receipt of a request for the at least one first document structure comprises program code for anticipating receipt of a request from a user based on a request history associated with the user.

* * * * *